E. R. DRAVER.
SPEEDOMETER DRIVE FOR AUTOMOBILES.
APPLICATION FILED FEB. 8, 1911.
1,035,169.
Patented Aug. 13, 1912.
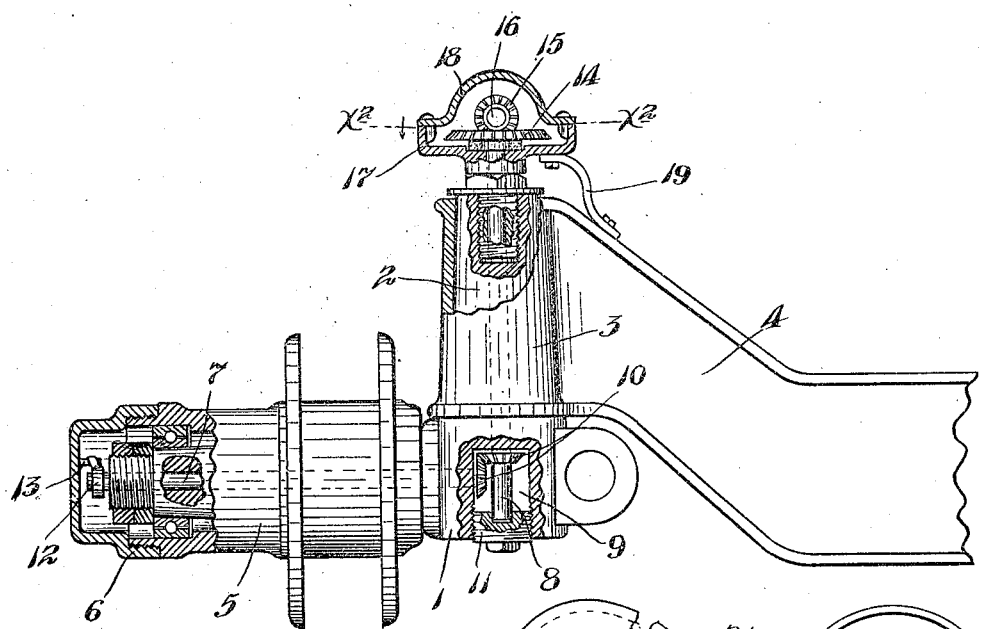
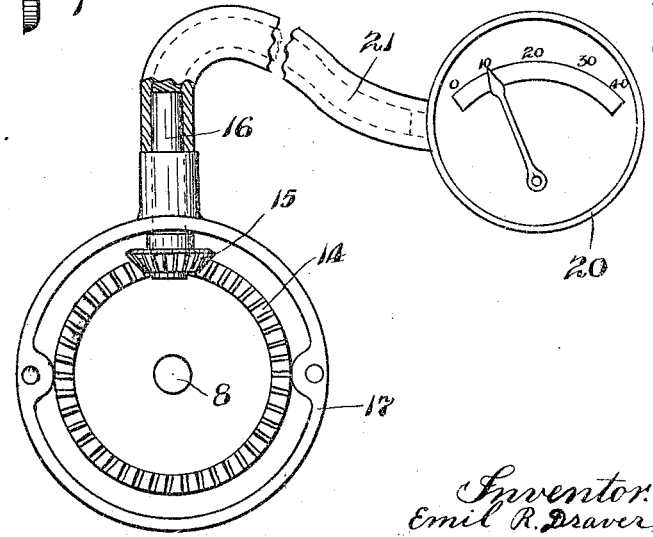
Witnesses.
Harry Opsahl.
A. H. Opsahl.
Inventor.
Emil R. Draver
By his Attorneys
Williamson Merchant

UNITED STATES PATENT OFFICE.

EMIL R. DRAVER, OF RICHMOND, INDIANA.

SPEEDOMETER-DRIVE FOR AUTOMOBILES.

1,035,169.     Specification of Letters Patent.     Patented Aug. 13, 1912.

Application filed February 8, 1911. Serial No. 607,267.

*To all whom it may concern:*

Be it known that I, EMIL R. DRAVER, a citizen of the United States, residing at Richmond, in the county of Wayne and State of Indiana, have invented certain new and useful Improvements in Speedometer-Drives for Automobiles; and I do hereby declare the following to be a full, clear, and exact description of the invention, such as will enable others skilled in the art to which it appertains to make and use the same.

My invention has for its object to provide an improved speedometer drive for driving a speedometer from one of the front or steering wheels of an automobile and, to this end, the invention consists of the novel devices and combinations of devices hereinafter described and defined in the claims.

Speedometers, as is well known, are, when applied to automobiles, customarily driven from the front wheels thereof, which wheels are journaled on the spindle of pivotally mounted steering knuckles. This has been accomplished in many different ways, but usually by the use of a flexible shaft and always, so far as I am aware, by the use of gears that are exposed to mud, dirt and other destructive elements.

In accordance with my invention, the speedometer is driven from the front or steering wheel by a driving mechanism which includes a driving shaft extended through and journaled in the spindle of the steering knuckle. The connection between the outer end of this shaft and the hub of the wheel is preferably made by connecting an arm on the outer end of said shaft to a detachable cap of the hub. The inner end of the said driving shaft, in some instances, is geared to an upright driven shaft that is extended through and journaled in the upright arm or trunnion of the steering knuckle; but the said so-called driven shaft is, in other instances, mounted and extended in various different ways on the knuckle. The said driven shaft, in some instances, may be directly connected to the speedometer through a flexible shaft, but in other instances, this is accomplished through coöperating intermediate gears and shafts. In all instances, however, the gears which connect the several shafts of the speedometer drive should be incased so that they may run in oil or grease and are protected from dirt and dust.

In the accompanying drawings, which illustrate several forms of the invention, like characters indicate like parts throughout the several views.

Referring to the drawings, Figure 1 is a view in front elevation, with some parts broken away and some parts sectioned, showing the improved speedometer drive applied to the knuckle of an automobile front axle; and Fig. 2 is a detail view of certain of the parts shown in Fig. 1, with the sections of the upper gear case separated on the line $x^2$ $x^2$ of Fig. 1, and also showing diagrammatically the connected speedometer.

A steering knuckle 1 has an upright arm or trunnion 2 journaled in a socket 3 formed in the end of the front axle 4. The hub 5 only of the coöperating front or steering wheel is shown, and this is journaled in the customary way on the spindle or horizontal arm of the steering knuckle 1. The hub 5 is shown as provided with the customary detachable cap 6 at its outer end. In the arrangement of the speedometer drive shown in Figs. 1 and 2, the spindle or horizontal arm of the steering knuckle is bored out to form an axial seat for the so-called driving shaft 7, and the trunnion or vertical arm of said knuckle is bored out to form an axial seat for the so-called upright driven shaft 8. The hub of the knuckle 1 has an enlarged recess 9 to afford a space for intermeshing miter gears 10 secured one to the driving shaft 7 and one to the driven shaft 8. The lower end of the recess 9 is normally closed by a threaded plug 11 which, as shown, also affords a bearing for the lower end of the shaft 8. The outer end of the driving shaft 7 is provided with a radially projecting arm 12 that is engaged by a lug 13 on the hub cap 6, so that the said shaft 7 will be caused to rotate with the wheel hub 5. The upper end of the driven shaft 8, as shown, is provided with a bevel gear 14 that meshes with a bevel pinion 15 of a short shaft 16. As shown, the gears 14 and 15 work within a gear case made up of sections 17 and 18, the former of which is secured to the axle 4 by a bracket 19. The shaft 16 is journaled in a bearing on the member 17.

In Fig. 2, a speedometer is indicated as an entirety by the numeral 20 and, for illustrative purposes, this speedometer is shown as connected to the shaft 16 by a flexible shaft 21.

It is important to note that the transmission gears 14 and 15 are located within, and their shafts are journaled in the gear case 17—18, and that the latter is secured to the axle 4 so that it partakes of the movements of the axle. Also, it will be noted, that the gear shaft 16, to which the flexible shaft 21 is attached, except in its rotary movement, also partakes of the movements of the axle 4. This is a highly desirable construction because the oscillatory movements of the steering knuckle does not kink or bend the flexible shaft or other terminating connection between the said gear 15 and the speedometer.

What I claim is:

1. The combination with an axle, a steering knuckle pivoted thereto, and a wheel hub journaled on the spindle of said knuckle, of a speedometer drive comprising a rotary shaft carried by and partaking of all of the movements of said axle, but with the said knuckle free for pivotal movements independently of movements of said axle and rotary shaft, whereby the said shaft is free from the pivotal movements of said knuckle.

2. The combination with an axle, a steering knuckle pivoted thereto and a wheel hub journaled on the spindle of said knuckle, of a swivel acting speedometer drive applied in part to said knuckle and in part to said axle, and comprising a rotary shaft carried by and partaking of the movements of said axle, but with the said knuckle free for pivotal movements independently of movements of said axle and rotary shaft, whereby the said rotary shaft is free from the pivotal movements of said knuckle.

3. In a speedometer drive, the combination with an axle, a steering knuckle pivoted thereto, and a wheel hub journaled on the spindle of said knuckle, of a speedometer, and a speedometer drive, comprising a horizontal shaft extended through the spindle of said knuckle and connected to said wheel hub, a vertical shaft journaled in the body of said knuckle, gears connecting said shafts, a shaft bearing secured in respect to said axle and partaking of all of the movements thereof, a third shaft journaled in said bearing, and a flexible shaft connecting said third shaft to said speedometer.

In testimony whereof I affix my signature in presence of two witnesses.

EMIL R. DRAVER.

Witnesses:
E. V. DICKINSON,
T. J. FERGUSON.